United States Patent [19]

Chao-Chun

[11] Patent Number: 4,750,519
[45] Date of Patent: Jun. 14, 1988

[54] FAUCET VALVE FOR BUFFERING HIGH-PRESSURE WATER

[76] Inventor: Yu Chao-Chun, P.O. Box 10160, Taipei, Taiwan

[21] Appl. No.: 45,085

[22] Filed: May 4, 1987

[51] Int. Cl.[4] .................................. F16K 11/078
[52] U.S. Cl. .................... 137/625.17; 137/625.4
[58] Field of Search .......... 137/625.17, 625.4, 801

[56] References Cited

U.S. PATENT DOCUMENTS

| | | | |
|---|---|---|---|
| 3,168,112 | 2/1965 | Klingler | 137/625.17 |
| 4,010,772 | 3/1977 | Palmer et al. | 137/625.17 |
| 4,033,373 | 7/1977 | Manoogian et al. | 137/625.17 X |

Primary Examiner—John Rivell

[57] ABSTRACT

A faucet valve includes a housing fluidically communicated with a cold water source, a hot water source, and a discharge pipe; and an actuating handle rotatably or reciprocatively mounted in the housing, wherein a lowest buffering disk is secured under the handle and reciprocatively moving within a through hole formed in a bottom valve seat to buffer any high pressure exerting at the discharge water stream for the smooth operation of the handle.

3 Claims, 2 Drawing Sheets

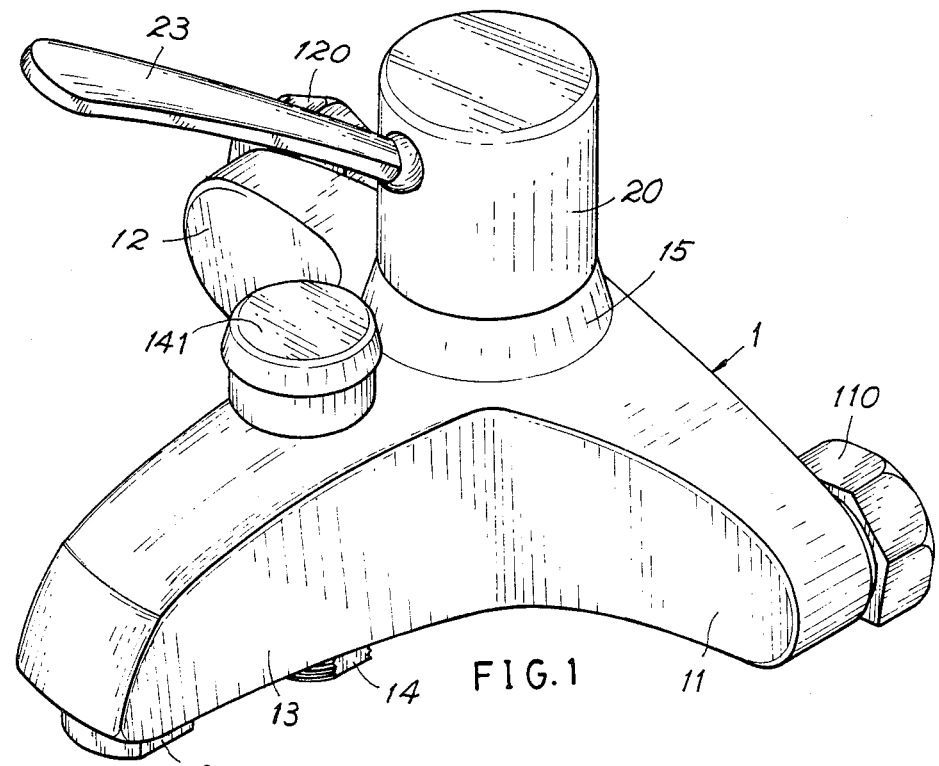
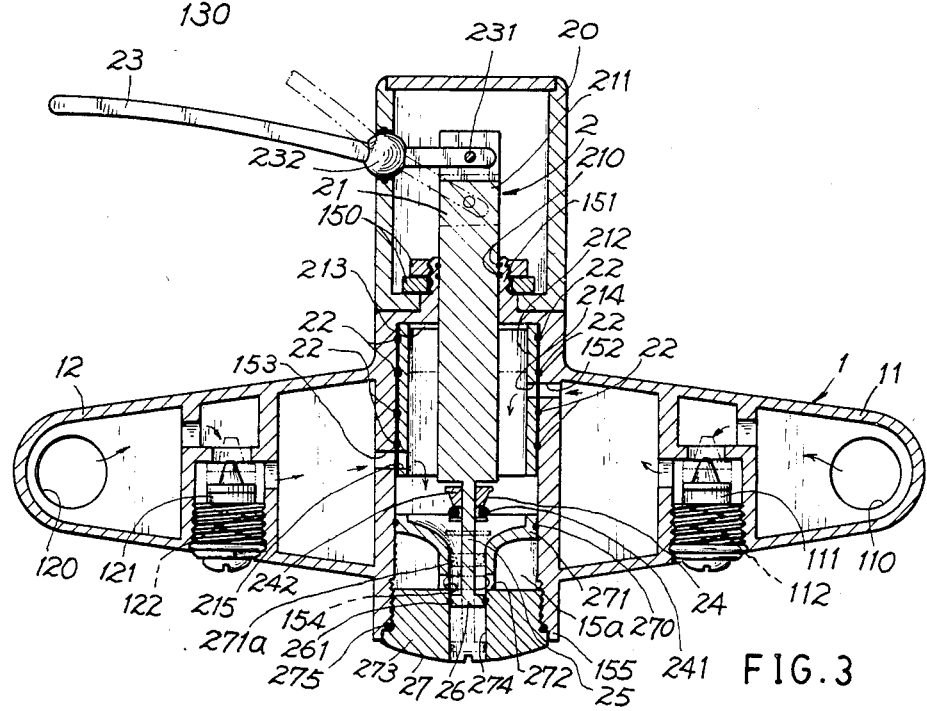

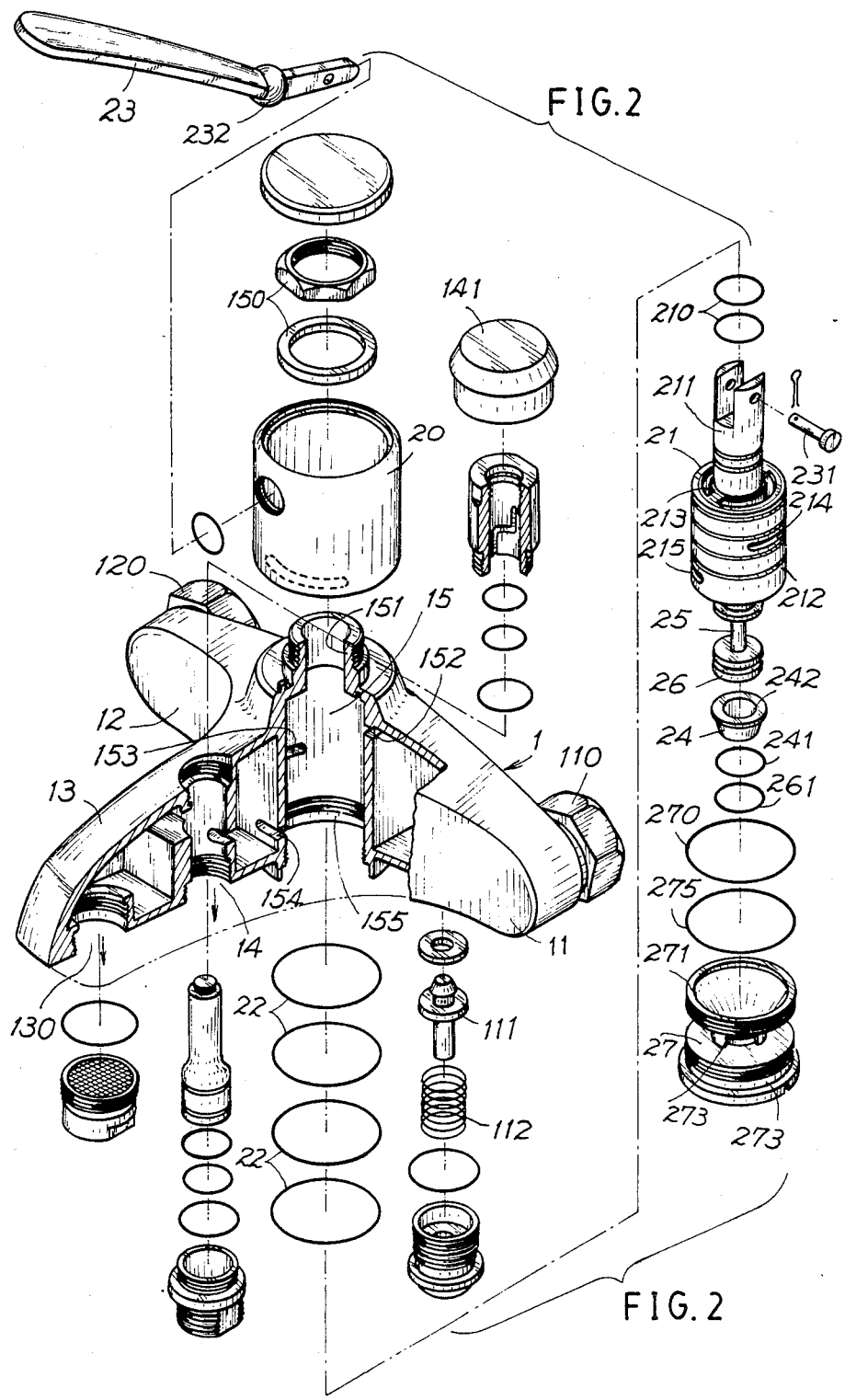

FAUCET VALVE FOR BUFFERING HIGH-PRESSURE WATER

BACKGROUND OF THE INVENTION

Manoogian et. al. disclosed a single handle water faucet valve in their U.S. Pat. No. 4,033,373, which includes a housing respectively communicated with pressurized hot water and cold water, and connected with a water discharge passage operatively sealable by a discharge valve for discharging mixing water therethrough. However, such a conventional faucet valve has the following defects:

1. When the discharge valve (34) is slightly opened from its original closing state, the high water pressure exerting in the bore (27) will suddenly drag the central valve member (38) upwardly to discharge much quantity of water, which is especially harmful to an end user when the sudden discharge fluid is a hot water.

2. The input passages of both cold and hot water are coplanar and symmetrically disposed on two opposite sides of the valve member so that the cold water stream may penetrate into the hot water stream to influence the mixing homogeneity since the hot water stream has a pressure less than that of the cold stream since the hot water flows through a gas heater to cause frictional loss or pressure drop through the heater.

3. If the discharge outlet is partially clogged by pollutants, the handle will bear against a higher pressure exerting inside the housing chamber to thereby increase the difficulty to adjust the quantity of a discharge water stream.

The present inventor has found the defects of a conventional faucet valve and invented the present faucet especially for buffering high water pressure.

SUMMARY OF THE INVENTION

The object of the present invention is to provide a faucet valve including: a housing fluidically communicated with a cold water inlet connector, a hot water inlet connector, and a discharge pipe; and an actuating handle rotatably and reciprocatively mounted within the housing, wherein a lowest buffering disk is secured under the handle and reciprocatively moving within a through hole formed in a bottom valve seat to thereby buffer any high pressure exerting at the discharge stream to prevent the difficult operation of handle.

BRIEF DESCRIPTION OF THE DRAWINGS

FIG. 1 is a perspective illustration of the present invention.

FIG. 2 is a perspective view showing all elements constructing the present invention.

FIG. 3 is a sectional drawing of the present invention.

DETAILED DESCRIPTION

As shown in the figures, the present invention comprises: a housing 1 and an actuating handle 2.

The housing 1 includes a right inlet pipe 11 fluidically communicated with a cold water inlet connector 110, a left inlet pipe 12 fluidically communicated with a hot water inlet connector 120, a central barrel 15 formed on the central portion of the housing 1 having a cold water inlet opening 152 formed on a right upper portion of the barrel communicated with the right pipe 11 and a hot water inlet opening 153 formed on a left lower portion of the barrel communicated with the left inlet pipe 12, and a discharge pipe 13 extending outwardly from the central barrel 15 to be perpendicular to said right and left pipes 11, 12 adapted to discharge the water from a discharge opening 154 formed on the lower portion of the barrel 15. The discharge pipe 13 includes a water outlet port 130 and a branched water outlet 14 controlled by a switching handle 141 operatively switched to a by-pass shower for additional shower use.

In the right inlet pipe 11, there is provided a right check valve 111 restored by a spring 112 allowing cold water entrance but excluding the backflow of water toward the cold water souce through connector 110. A left check valve 121 retained by a spring 122 is provided in the left pipe 12 to allow hot water entrance but excluding the backflow of water toward the hot water source through connector 120.

The central barrel 151 is formed with a cylindrical bore portion 15a including an upper neck 15 for rotatably mounting a spindle 21 of the handle 2 therein as retained by a washer and a nut 150, a cold water opening 152, a hot water opening 153, a discharge opening 154 communicated with port 130 and outlet 14, and a bottom threaded portion 155.

The actuating handle 2 includes: an upper bonnet 20 rotatably mounted on the upper neck 15 of the central barrel 15 (the bottom of bonnet 20 is formed with an arcuated groove movably engaged and limited by a pin formed on the barrel), a spindle 21 rotatably and reciprocatively mounted within a bore 15a of central barrel 15, a handle 23 having its innermost end 231 pivotally connected with an upper portion of the spindle 21 and having a fulcrum ball 232 proximate to its innermost end 231 pivotally universally mounted on the bonnet 20, a lower plug 24 fixed on a lower stem 25 secured under the spindle 21, a lowest buffering disk 26 formed on the lowest end of the stem 25, and a bottom valve seat 27 snugly fixed in the bottom threaded portion 155.

The spindle 21 includes: a central stem 211 having its upper end pivotally connected to the handle 23, a plunger cylinder 212 having an annular hollow portion 213 secured to the central stem 211 and rotatably engaged within the bore portion 15a of barrel 15, a right arcuate slot 214 transversely formed on the right upper perimeter of the cylinder 212 fluidically communicated with the inlet opening 152 and with the hollow portion 213, and a left arcuate slot 215 transversely formed on the left lower perimeter of the cylinder 212 fluidically communicated with the inlet opening 153. The upper portion of spindle 21 is sealed by two packing rings 210 retained inside the neck portion 151.

The lower plug 24 includes a truncated-cone-shaped packing 242 having its lower portion tapered and followed by a lower packing ring 241, both fixed on the stem 25 and operatively sealing a central hole 271a formed in the valve seat 27. The buffering disk 26 is reciprocatively moving within a central through hole 274 formed through the seat 27, as sealed by a packing ring 261.

The bottom valve seat 27 includes a trumpet-shape seat portion 271 fixed in the bore 15a by a packing ring 270 and formed on the upper portion of the seat 27 having a central hole 271a formed in the upper portion of the seat 27 to be operatively sealed by the lower plug 24, plural transverse discharge holes 272 transversely formed on a middle portion of the seat fluidically communicated with the central hole 271a and the discharge opening 154, and a bottom cap 273 secured to the bottom threaded portion 155 of central barrel 15 by a packing ring 275. The cap 273 has a central through hole 274 formed on the central portion of the cap 273.

When moving the handle 23 to its middle position projectively coplanar to the discharge pipe 13 and depressing the handle 23 downwardly, the spindle 21 will be raised to open the plug 24 from the seat portion 271 to allow mixing water discharge through the central hole 271a, transverse discharge.

When completely closing the valve of the present invention, the handle 23 is raised upwardly to lower the plug 24 seal the seat portion 271 as shown in dotted line of FIG. 3 (The cylinder 212 will be lowered to stop on the seat portion 271). The spindle cylinder 212 is formed with four packing rings 22 of which the two upper rings are formed above the right slot 214 which serve to seal the cold water inlet through opening 152 and the two lower rings are formed under the right slot 214 and above the left slot 215 to seal the hot water inlet through opening 153 when lowering the spindle 21 to close the plug 24 on seat 27 enhancing sealing purpose.

When it is expected to supply cold water only, the handle 23 is rotated rightwardly to open the passage of cold water, i.e., to open opening 152 and slot 214 for cold-water supply, whereas the left-side slot 215 of spindle 21 is deviated from communication with the opening 153 to interrupt the hot-water supply. Natuarally, by operating the handle 23 leftwardly, a hot water stream will be supplied for end use.

The two packings of lower ring 241 and upper packing 242 can doubly secure the sound sealing on the seat portion 271 so that if any packing of the two packings 241, 242 is damaged, the other packing still remains sealable and operative.

When opening the plug 24 and if any pollutants partially clogging the outlet port 13, the surge of water will cause a higher pressure in the bore portion 15a may be buffered by the disk 26 to thereby reduce the high pressure bearing against the spindle 21 of handle 2, without influencing the smooth operation of handle 23 when adjusting water discharge rate.

I claim:

1. A faucet valve comprising:

a housing including: a right inlet pipe fluidically communicated with a cold water inlet; a left inlet pipe fluidically communicated with a hot water inlet; a central barrel formed on a central portion of said housing having a cylindrical bore portion, an upper neck, a cold water opening formed on a right upper portion of said barrel, a hot water opening formed on a left lower portion of said barrel a discharge opening and a bottom threaded portion; and a discharge pipe communicated with said discharge opening of said central barrel having a water outlet port formed therein; and an actuating handle including: an upper bonnet rotatably mounted on the upper neck of said central barrel; a spindle having a central stem pivotally connected with a handle pivotally universally mounted on the upper bonnet; a plunger cylinder secured to the central stem and rotatably engaged within said bore portion of said barrel and having a right arcuate slot formed on a right upper perimeter of said plunger cylinder operatively fluidically communicated with said cold water opening and a left arcuate slot formed on a left lower perimeter of said plunger cylinder operatively fluidically communicated with the hot water opening;

a lower plug formed on a lower stem secured under said spindle; a lowest buffering disk formed on the lowest end of said lower stem; and a bottom valve seat engaged with and fixed on the bottom threaded portion of said barrel;

said spindle cylinder having four packing rings of which two upper rings are formed above said right arcuate slot operatively sealing said cold water inlet through said cold water opening and two lower rings are formed under said right arcuate slot and above said left arcuate slot operatively sealing said hot water inlet through said hot water opening when lowering said spindle to close said plug;

the improvement which comprises: said lowest buffering disk reciprocatively moving within a central through hole formed on a bottom cap fixed on said bottom threaded portion of said barrel;

said bottom valve seat including a trumpet-shape seat portion formed on an upper portion of the seat and having a central hole formed in the upper portion of said seat operatively sealed by said lower plug, and plural transverse discharge holes transversely formed on a middle portion of said seat fluidically communicated with said central hole formed on the upper portion of said seat portion and the discharge opening, whereby upon a surge of a high-pressure water stream, the buffering disk is forced to buffer any such high pressure for the smooth operation of said handle.

2. A faucet valve according to claim 1, wherein either said right inlet pipe or left inlet pipe is provided with a check valve therein to prevent any backflow of the water stream.

3. A faucet valve according to claim 1, wherein said lower plug is formed with a truncated-cone-shaped packing having its lower portion tapered and followed by a lower packing ring.

* * * * *